United States Patent
Lee

(10) Patent No.: US 10,684,923 B2
(45) Date of Patent: Jun. 16, 2020

(54) REAL TIME FILE ALTERATION SENSING-BASED AUTOMATIC BACKUP DEVICE

(71) Applicant: Ho Jun Lee, Seoul (KR)

(72) Inventor: Ho Jun Lee, Seoul (KR)

( * ) Notice: Subject to any disclaimer, the term of this patent is extended or adjusted under 35 U.S.C. 154(b) by 0 days.

(21) Appl. No.: 16/613,414

(22) PCT Filed: Aug. 9, 2018

(86) PCT No.: PCT/KR2018/009057
§ 371 (c)(1),
(2) Date: Nov. 25, 2019

(87) PCT Pub. No.: WO2019/045309
PCT Pub. Date: Mar. 7, 2019

(65) Prior Publication Data
US 2020/0142781 A1 May 7, 2020

(30) Foreign Application Priority Data

Aug. 29, 2017 (KR) .......................... 10-2017-0109181

(51) Int. Cl.
| | |
|---|---|
| *G06F 12/00* | (2006.01) |
| *G06F 12/08* | (2016.01) |
| *G06F 13/00* | (2006.01) |
| *G06F 11/14* | (2006.01) |

(52) U.S. Cl.
CPC ...... *G06F 11/1464* (2013.01); *G06F 11/1435* (2013.01); *G06F 11/1451* (2013.01); *G06F 11/1461* (2013.01); *G06F 11/1469* (2013.01)

(58) Field of Classification Search
CPC ............. G06F 11/1435; G06F 11/1451; G06F 11/1461; G06F 11/2056

USPC ......................................................... 711/162
See application file for complete search history.

(56) References Cited

U.S. PATENT DOCUMENTS

2005/0160313 A1* 7/2005 Wu ...................... G06F 11/2056
714/13
2014/0310293 A1 10/2014 Knoll et al.

FOREIGN PATENT DOCUMENTS

| | | |
|---|---|---|
| JP | 2007-520760 A | 7/2007 |
| KR | 10-2002-0065976 A | 8/2002 |
| KR | 10-2004-0031516 A | 4/2004 |
| KR | 10-2007-0088889 A | 8/2007 |
| KR | 10-2009-0013972 A | 2/2009 |
| KR | 10-2010-0079419 A | 7/2010 |

(Continued)

OTHER PUBLICATIONS

International Search Report for PCT/KR2018/009057 dated Nov. 13, 2018 from Korean Intellectual Property Office.

*Primary Examiner* — Mohamed M Gebril
(74) *Attorney, Agent, or Firm* — Revolution IP, PLLC

(57) ABSTRACT

A real time file alteration sensing-based automatic backup device includes: a backup target selection unit selecting one or more backup targets that are accessible over a network and are subjected to backup; a content alteration sensing unit sensing in real time whether contents of the one or more backup targets are altered or scanning all the backup targets for sensing at particular-time intervals; a backup data generation unit generating, when the alteration of the content of the backup target is sensed, backup data containing information required for recovery of the sensed backup target; and a backup data storage unit storing the generated backup data.

4 Claims, 4 Drawing Sheets

(56) References Cited

FOREIGN PATENT DOCUMENTS

| | | | |
|---|---|---|---|
| KR | 10-0968754 | B1 | 7/2010 |
| KR | 10-1763184 | B1 | 8/2017 |

* cited by examiner

REAL TIME FILE ALTERATION SENSING-BASED AUTOMATIC BACKUP DEVICE

TECHNICAL FIELD

The present invention relates to a real time file alteration sensing-based automatic backup technology. More particularly, the present invention relates to a real time file alteration sensing-based automatic backup device that is capable of recovering, when unexpected damage to a file occurs, an original file thereof.

BACKGROUND ART

Computer operating systems (OS) and application programs generate a variety of data. Storage devices such as hard disks and cloud servers may store data required for computer operation and program execution. Loss of data may occur due to unintentional causes, such as damage to storage devices, program malfunction, or the like. Data backup technology may reduce a bad influence caused by the data loss.

Korean Patent No. 10-0968754 (Jul. 1, 2010) relates to a data backup system and a method thereof. More specifically, backup software is automatically installed on a user terminal without a user's operation, and even if several user terminals simultaneously access a backup server, the backup server's capacity and/or traffic is not overloaded.

Korean Application Publication No. 10-2007-0088889 (Aug. 30, 2007) relates to a data backup method for a network. More specifically, there has been provided a data backup method for a network in which in UPnP home network, storage space of a storage disk provided in a home AV device is utilized as backup space. To this end, the data backup method of this invention includes, recognizing the storage disk of the device at a control point of the home network to obtain information of the disk, and setting a backup location on the storage disk to make a request to the device for backup for data stored in the storage disk.

Documents of Related Art

PATENT DOCUMENTS

1. Korean Patent No. 10-0968754 (Jul. 1, 2010)
2. Korean Patent Application Publication No. 10-2007-0088889 (Aug. 30, 2007)

DISCLOSURE

Technical Problem

An embodiment of the present invention is intended to propose a real time file alteration sensing-based automatic backup device that is capable of recovering, when recovery is required due to unexpected damage to a file, an original file thereof by selecting a particular point in time series.

An embodiment of the present invention is intended to propose a real time file alteration sensing-based automatic backup device that is capable of sensing whether a content of a backup target is altered and of automatically generating backup data and storing the same.

An embodiment of the present invention is intended to propose a real time file alteration sensing-based automatic backup device that is capable of securing storage space according to a predetermined reference in case the storage space of the automatic backup device is insufficient.

Technical Solution

In embodiments, a real time file alteration sensing-based automatic backup device includes: a backup target selection unit selecting one or more backup targets that are accessible over a network and are subjected to backup; a content alteration sensing unit sensing in real time whether contents of the one or more backup targets are altered or scanning all the backup targets for sensing at particular-time intervals; a backup data generation unit generating, when the alteration of the content of the backup target is sensed, backup data containing information required for recovery of the sensed backup target; and a backup data storage unit storing the generated backup data.

The real time file alteration sensing-based automatic backup device may further include a backup target recovery unit performing, when a request for recovery of the backup target is received, recovery of the backup target on the basis of the backup data stored in the backup data storage unit.

The backup target recovery unit may perform recovery on the basis of any one of one or more pieces of the backup data for the same backup target stored in the backup data storage unit.

The content alteration sensing unit may scan all the backup targets to extract an alteration candidate file of which at least one among a file storage time and a file size is altered, and may compare the alteration candidate file to the most recent backup data stored in the backup data storage unit, thereby sensing whether the content is altered.

The backup data generation unit may generate the backup data containing at least one among an original content, a change time, and a storage location of the backup target.

The backup data generation unit may generate first backup data by compressing the backup data or may generate, when the same backup data is present, second backup data containing only information on a link for the backup data.

The backup data storage unit may secure, when a capacity of the backup data exceeds a storable capacity of the backup data storage unit, the storable capacity according to a particular option and then stores the backup data.

The backup data storage unit may secures the storable capacity according to any one option among an option of initializing the backup data storage unit, an option of deleting except only a particular amount of the backup data in chronological order, and an option of deleting except only the backup data after a particular point in time.

Advantageous Effects

The disclosed technique may have the following effects, but this it does not mean that a particular embodiment should include all of or only the following effects. Therefore, the scope of the disclosed technology should not be construed as being limited thereby.

The real time file alteration sensing-based automatic backup device according to the embodiment of the present invention can sense whether the content of the backup target is altered and can automatically generate backup data and store the same.

The real time file alteration sensing-based automatic backup device according to the embodiment of the present invention can secure the storage space according to a predetermined reference in case the storage space of the automatic backup device is insufficient.

BEST MODE

Figure 1:
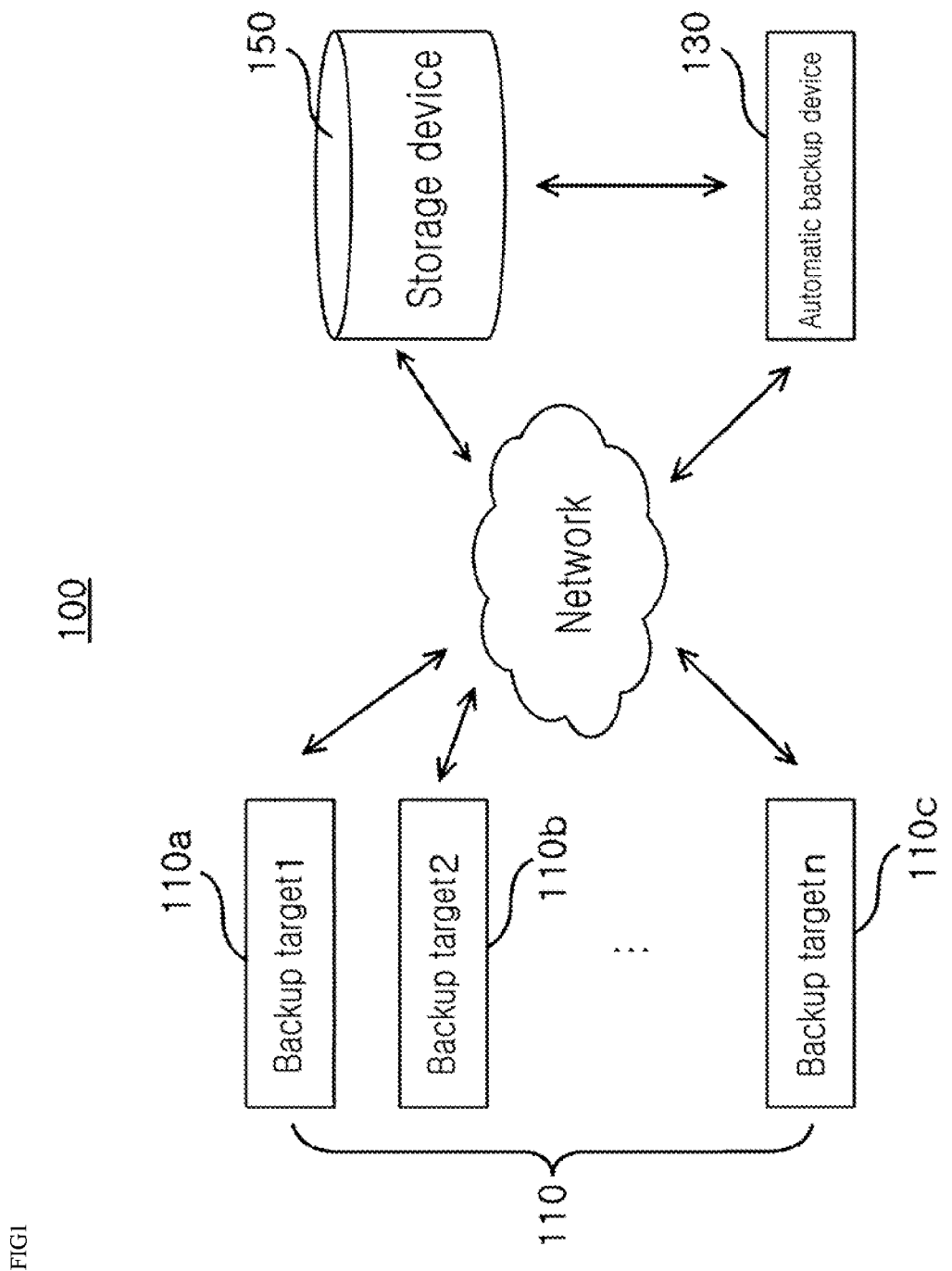
FIG. 1 is a diagram illustrating a real time file alteration sensing-based automatic backup system according to an embodiment of the present invention.

Description of the present invention is merely an embodiment for structural or functional description, so the scope of the present invention should not be construed to be limited to the embodiments described in the specification. That is, since the embodiments of the invention can be variously changed and have various forms, the scope of the present invention should be understood to include equivalents capable of realizing the technical idea. Further, the objectives or the effects presented in the present invention do not mean that a particular embodiment should include all of or only the effects. Therefore, the scope of the present invention should not be construed as being limited thereby.

Meanwhile, meanings of terms described in the present application should be understood as follows.

The terms "first", "second", and the like are used to differentiate one component from other components, but the scope of the present invention should not be construed to be limited by the terms. For example, a first element could be termed a second element, and, similarly, a second element could be termed a first element.

It will be understood that when an element is referred to as being "connected to" another element, it may be directly connected to the other element or intervening elements may be present therebetween. In contrast, it will be understood that when an element is referred to as being "directly coupled" to another element, there are no intervening elements present. Meanwhile, other expressions describing the relationship of the components, that is, expressions such as "between" and "directly between" or "adjacent to" and "directly adjacent to" should be similarly construed.

It will be understood that the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

In each step, reference characters (e.g., a, b, c, etc.) are used for convenience of description, the reference characters are not used to describe the order of the steps and unless otherwise stated, it may occur differently from the order specified. That is, the respective steps may be performed similarly to the specified order, performed substantially simultaneously, or performed in the reverse order.

The present invention can be implemented as a computer-readable code on a computer-readable recording medium, and the computer-readable recording medium includes all types of recording devices for storing data that can be read by a computer system. Examples of the computer readable recording medium include a ROM, a RAM, a CD-ROM, a magnetic tape, a floppy disk, an optical data storage device, and the like.

If it is not contrarily defined, all terms used herein have the same meanings as those generally understood by those skilled in the art to which the present invention belongs. Terms which are defined in a generally used dictionary should be interpreted to have the same meaning as the meaning in the context of the related art, and are not interpreted as an ideal meaning or excessively formal meanings unless clearly defined in the present application.

FIG. 1 is a diagram illustrating a real time file alteration sensing-based automatic backup system according to an embodiment of the present invention.

Referring to FIG. 1, the real time file alteration sensing-based automatic backup system 100 (hereinafter, referred to as an automatic backup system) includes backup targets 110, an automatic backup device 130, and a storage device 150.

The backup targets 110 are files or devices that are targets to be protected by automatic backup for original data. When the backup targets 110 are files, the backup targets 110 may correspond to main files for operating a particular system or main files for executing a particular program. When the backup targets 110 are devices, the backup targets 110 may be partial component devices constituting a particular system or the entire device of a particular system.

The backup targets 110 may be connected to the automatic backup device 130 over a network, or may be connected to the same in a wireless manner via Bluetooth, Wi-Fi, or the like. The backup targets 110 may transmit or receive data from the automatic backup device 130 over the network.

The automatic backup device 130 may correspond to a device that senses alteration of the contents of the backup targets 110 and generates backup data of the altered backup targets 110 and stores the generated backup data. The automatic backup device 130 may be implemented as including the storage device 150. The automatic backup device 130 may have an NAS function.

Herein, the network-attached storage (NAS) may correspond to a file-level computer storage device connected to a computer network and may provide a data access right to different network clients.

More specifically, the network-attached storage (NAS) (may include single configuration or duplex configuration for failover) may correspond to a file-level data storage server connected to the network and may provide a file-based data storage service to different devices on the network. The network-attached storage may run other software, and may operate without a keyboard or a display device. The network-attached storage may perform control and a setting task over the network.

The storage device 150 may be a device storing the backup data. The storage device 150 may be implemented as being included in the automatic backup device 130, or may be implemented as being independent of the automatic backup device 130. When implemented as being independent of the automatic backup device 130, the storage device 150 may be connected to the automatic backup device 130 in a wired manner or in a wireless manner via Bluetooth, Wi-Fi, or the like, and may transmit and receive data from the automatic backup device 130.

Figure 2:
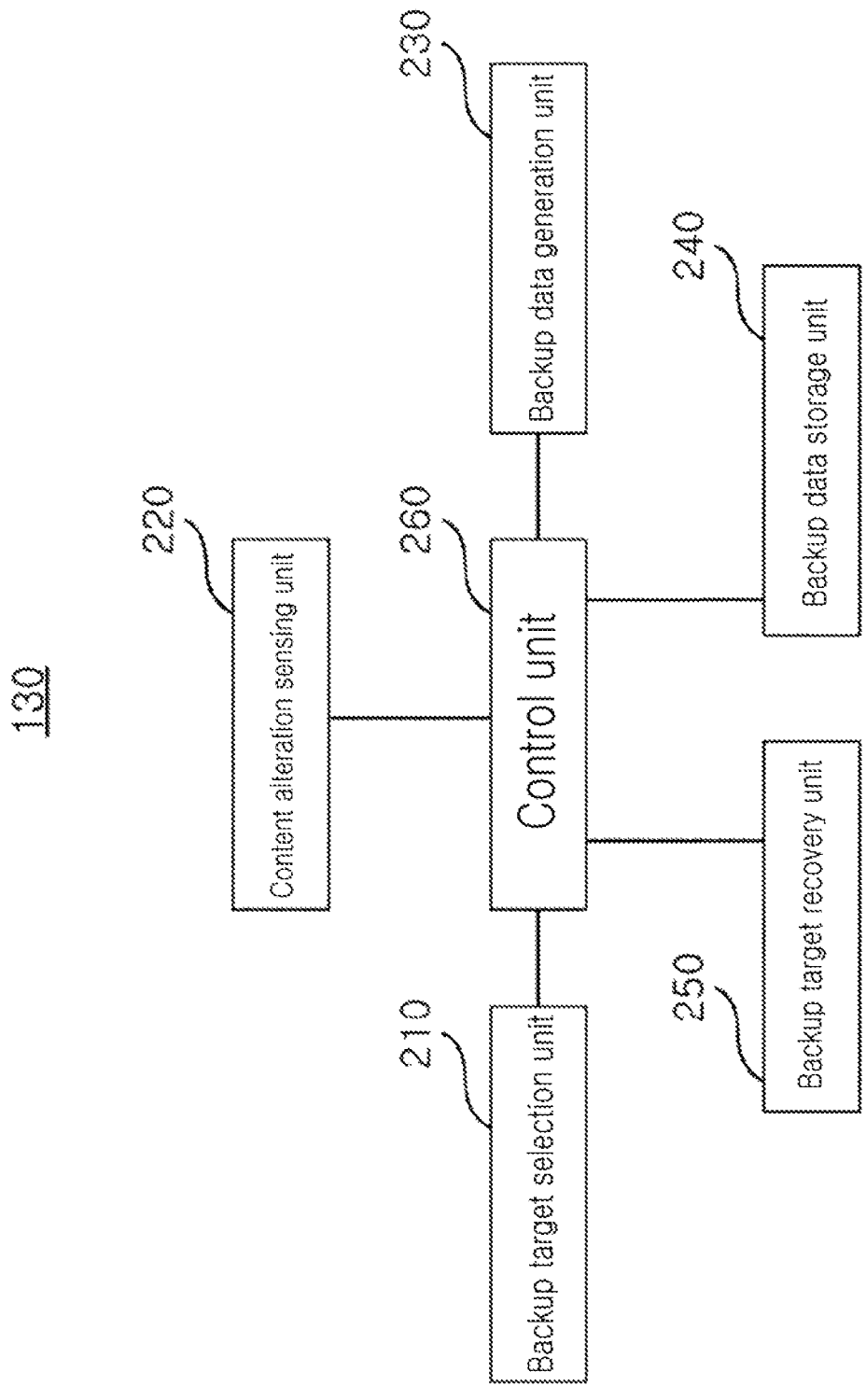
FIG. 2 is a diagram illustrating an automatic backup device of FIG. 1.

FIG. 2 is a diagram illustrating an automatic backup device of FIG. 1.

Referring to FIG. 2, the automatic backup device 130 includes a backup target selection unit 210, a content alteration sensing unit 220, a backup data generation unit 230, a backup data storage unit 240, a backup target recovery unit 250, and a control unit 260.

The backup target selection unit 210 may select one or more backup targets 110 to be subjected to backup. The backup target selection unit 210 may select some files within the same system as the backup targets 110 and may select some component devices as the backup targets 110. The backup target selection unit 210 may select some files or some component devices within an external system accessible over the network, as the backup targets 110.

In an embodiment, the backup target selection unit 210 may select some files or some component devices which are preset according to a particular time, as the backup targets 110. For example, in the case of performing backup for the entire system that includes sever devices in which at a particular time, server down occurs frequently due to concentration of connected users, the backup target selection unit 210 may select the server devices as the backup targets 110 so that backup for the server devices is performed at the particular time when connected users are concentrated.

The content alteration sensing unit 220 may sense in real time whether the contents of one or more backup targets 110 are altered or may scan all the backup targets 110 for sensing at particular-time intervals. When the automatic backup device 130 includes the NAS function, the content alteration sensing unit 220 senses in real time whether the file is altered.

More specifically, when the automatic backup device 130 includes the NAS function, the automatic backup device 130 directly manages the file system of the NAS. When the entire NAS is the backup target 110, it is not necessary for the content alteration sensing unit 220 to scan all the files stored in the NAS and the content alteration sensing unit 220 senses alteration of the contents of the files stored in the NAS in real time through communication with the control unit 260 of the automatic backup device 130

When the automatic backup device 130 does not include the NAS function, the content alteration sensing unit 220 scans all the backup targets 110 at particular-time intervals and senses whether alternation of the contents of the backup targets 110 takes place. Herein, the particular time refers to a time interval in which sensing alteration of the content is performed every 10 minutes, every one hour, or the like which is automatically or manually set.

In an embodiment, the content alteration sensing unit 220 may scan all the backup targets 110 to extract an alteration candidate file of which at least one among a file storage time and a file size is altered, and may compare the alteration candidate file to the most recent backup data stored in the backup data storage unit 240, thereby sensing whether the content is altered.

More specifically, the content alteration sensing unit 220 may scan all the backup targets 110 and may extract the files of which at least one among a file storage time and a file size is changed. The content alteration sensing unit 220 may compare the extracted files to the most recent backup data stored in the backup data storage unit 240.

The content alteration sensing unit 220 may use a commonly available file comparison operation or program for comparison between the extracted files and the backup data. For example, the content alteration sensing unit 220 may use a file comparison utility, such as the diff utility, or the like, or may use operation such as md5sum, sh512sum, sh256sum, or the like to compare the extracted files to the most recent backup data stored in the backup data storage unit 240.

The backup data generation unit 230 may generate, when alteration of the contents of the backup targets 110 is sensed, backup data including information required for recovery of the sensed backup targets 110. Herein, the information required for recovery may include various types of information, such as the original contents, a change time, storage locations for the backup targets, or the like, which are required for time series recovery.

The original contents may correspond to the contents before alteration of the contents of the backup targets 110 in which alteration of the contents is sensed, or may correspond to the most recent backup data of the backup targets 110 stored in the backup data storage unit 240. The storage locations refer to the locations where the original contents of the backup targets are stored, and may include information on locations in the backup data storage unit 240 in which the backup data is stored.

The backup data generation unit 230 may optimize and generate the backup data so that recovery is facilitated. For example, the backup data generation unit 230 may process the backup data in an intuitive form for generation so as to easily compare the backup data to the original content. The backup data generation unit 230 may configure the backup data in a convenient structure for generation so that recovery to a particular point in time is easy.

In an embodiment, the backup data generation unit 230 may generate the backup data including at least one among the original content, the change time, and the storage location of the backup target 110. For example, the backup data generation unit 230 may generate a first directory having a name the same as the file name of the backup target 110, and may generate, within the first directory, the backup data having the file name indicative of the change time.

The backup data generation unit 230 may generate a first directory having a name the same as the file name of the backup target 110, may generate, within the first directory, a second directory having a name indicative of the change time of the backup target, and then may generate, within the second directory, the backup data for the backup target.

Figure 4:
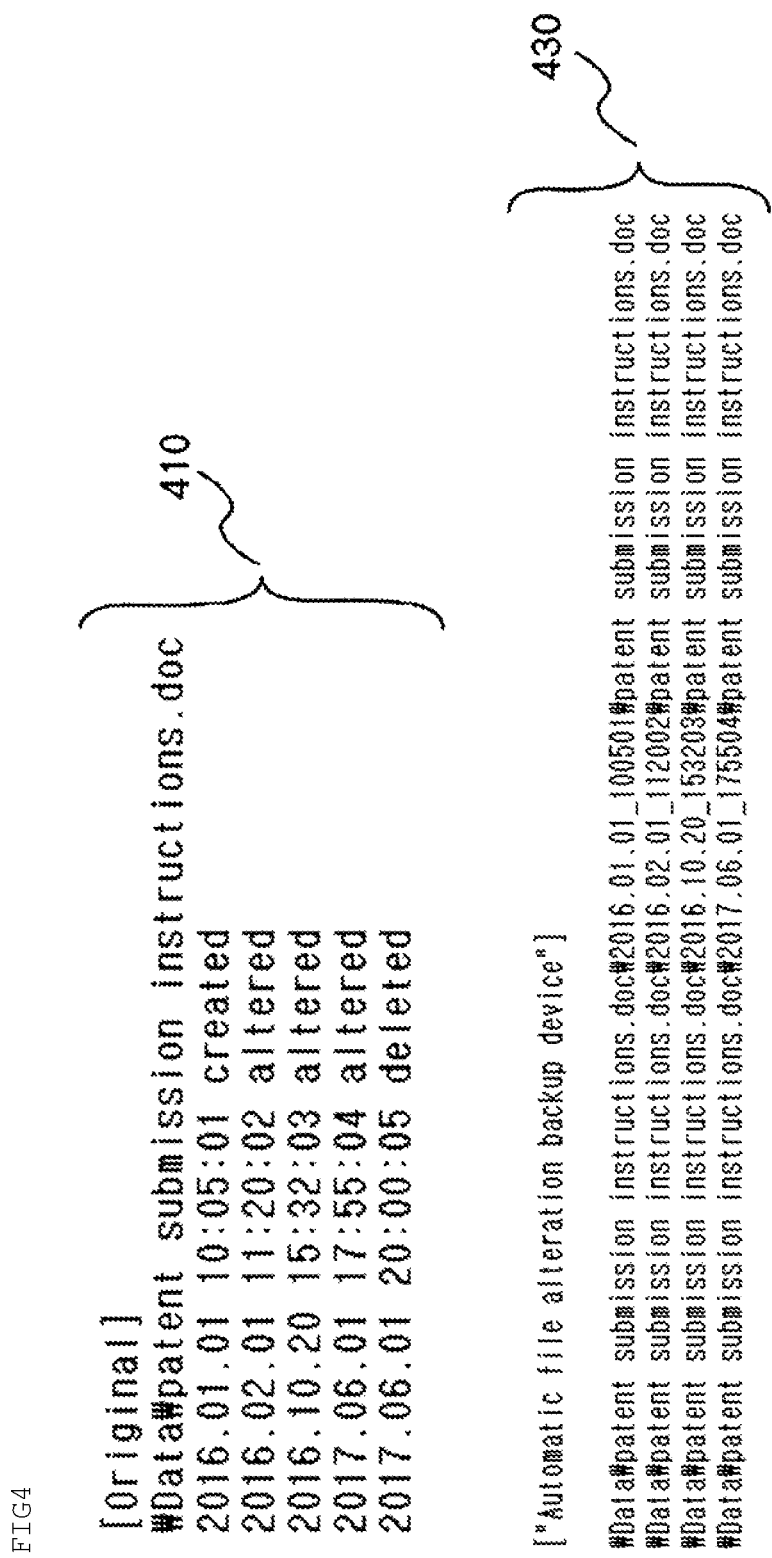
FIG. 4 is a diagram illustrating an example of a process of generating backup data which is performed in the automatic backup device.

FIG. 4 is a diagram illustrating an example of a process of generating backup data which is performed in the automatic backup device 130. Referring to FIG. 4, the automatic backup device 130 may sense the alteration 410 of the content of the backup target 110 through the content alteration sensing unit 220. The alteration 410 of the content may contain information on the time at which the alteration of the content occurred, and the detail of the alteration.

The automatic backup device 130 may generate the backup data 430 of the backup target 110 through the backup data generation unit 230. The backup data 430 may be stored in a location the same as a storage location of a backup target file. Further, a directory having a name the same as the file name of the backup target file and a directory having a name indicative of a point in time when alteration of the content occurred may be generated to store the original content.

For example, in the case where a file named "patent submission instructions.doc" stored in a folder named "data" is the backup target 110, when the file named "patent submission instructions.doc" is created Jan. 1, 2016, at 10:05:01 and alteration of the content occurs, the automatic backup device 130 performs automatic backup for the file.

More specifically, the backup data generation unit 230 may generate the same "data" folder in the backup data storage unit 240, may generate, within the "data" folder, a folder having a name the same as "patent submission instructions.doc" that is the file name of the backup target 110, and then may generate, within the folder, a folder having a name the same as "2016.01.01_100501" that is indicative of a point in time when the content has been altered. The backup data generation unit 230 may generate, in a final folder location, a backup file that has the same file name as the generated file of the backup target.

In an embodiment, the backup data generation unit 230 may generate first backup data by compressing the backup data, or may generate, when the same backup data is present, second backup data containing only information on a link for the backup data.

When backup data the same as the original content of the backup target is generated, there is a problem that the backup data cannot be stored due to insufficient storage space of the backup data storage unit 240. The backup data generation unit 230 may use a method for efficiently using the storage space. More specifically, the backup data generation unit 230 may generate the first backup data by compressing the backup data to reduce the capacity.

The backup data generation unit 230 may identify, before storing the backup data in the backup data storage unit 240, whether the same backup data is present. When the same backup data is present, the backup data generation unit 230 does not store the backup data and generate the second backup data containing the information on the link for the already present backup data, thereby efficiently using the storage space.

The backup data storage unit 240 may store the backup data generated by the backup data generation unit 230. When the automatic backup device 130 is implemented as including the storage device 150, the backup data storage unit 240 serves as the storage device 150.

In an embodiment, when the capacity of the backup data exceeds the storable capacity of the backup data storage unit 240, the backup data storage unit 240 secures the storable capacity according to a particular option and stores the backup data. Herein, the particular option may correspond to an option that is used to secure storage space in a general data storage device.

In an embodiment, the backup data storage unit 240 may secure the storable capacity according to any one option among an option of initializing the backup data storage unit 240 with the original data of the backup target 110, an option of deleting except only a particular amount of backup data in chronological order, and an option of deleting except only backup data after a particular point in time. Herein, the particular amount and the particular point in time may be set automatically or manually in the automatic backup device 130.

The backup data storage unit 240 may initiate the backup data storage unit 240 to secure the storable capacity and may store the original data of the backup target 110 as default backup data. The original data of the backup target 110 may correspond to the first stored backup data among the backup data stored in the backup data storage unit 240, or may correspond to data that the backup target 110 has at an initialization point in time.

In order to secure the storable capacity, the backup data storage unit 240 may delete the backup data stored in the backup data storage unit 240 except only the particular amount of backup data in chronological order. The backup data storage unit 240 stores several pieces of backup data when several alterations of the content occur with respect to the same backup target 110. Since the particular amount of backup data on the basis of the initialization point in time have a high probability of recovery, the particular amount of backup data are stored rather than deleted, whereby it is possible to respond to an unexpected request for recovery.

In order to secure the storable capacity, the backup data storage unit 240 may delete the backup data stored in the backup data storage unit 240 except only the backup data after the particular point in time. As the backup data gets older, there is a low probability that a request for recovery with respect to the backup data is received. Therefore, the backup data storage unit 240 deletes old backup data in which the probability of receiving the request for recovery is low so that the storable capacity is secured.

The backup target recovery unit 250 performs, when a request for recovery of the backup target 110 is received, recovery of the backup target 110 on the basis of the backup data stored in the backup data storage unit 240. Herein, the request for recovery may include information on the target required to be recovered, and information on a particular point in time required for recovery. The backup target recovery unit 250 may receive the request for recovery with the purpose of preventing a bad influence when unexpected damage to a particular file occurs, or with the purpose of various needs even though there is no unexpected damage.

The backup target recovery unit 250 may perform recovery of the backup target 110 by performing replacement, with the backup data stored in the backup data storage unit 240, on the backup target 110 requesting recovery. When the backup data is compressed and stored, the backup target recovery unit 250 performs recovery by performing replacement, with the uncompressed backup data, on the backup target 110.

When the backup data contains only the information on the link for the same backup data stored in the backup data storage unit 240, the backup target recovery unit 250 accesses the actual backup data using the link and performs replacement on the backup target 110 with the actual backup data, thereby performing recovery.

In an embodiment, the backup target recovery unit 250 may perform recovery on the basis of any one of one or more pieces of the backup data for the same backup target 110 stored in the backup data storage unit 240. More specifically, when a request for recovery with respect to a particular point in time is received, the backup target recovery unit 250 performs recovery on the basis of the backup data stored at a point in time closest to a recovery request point in time, among the one or more pieces of the backup data for the same backup target 110.

The control unit 260 may control the overall operation of the automatic backup device 130, and may manage the control flow or the data flow among the backup target selection unit 210, the content alteration sensing unit 220, the backup data generation unit 230, the backup data storage unit 240, and the backup target recovery unit 250.

Figure 3:
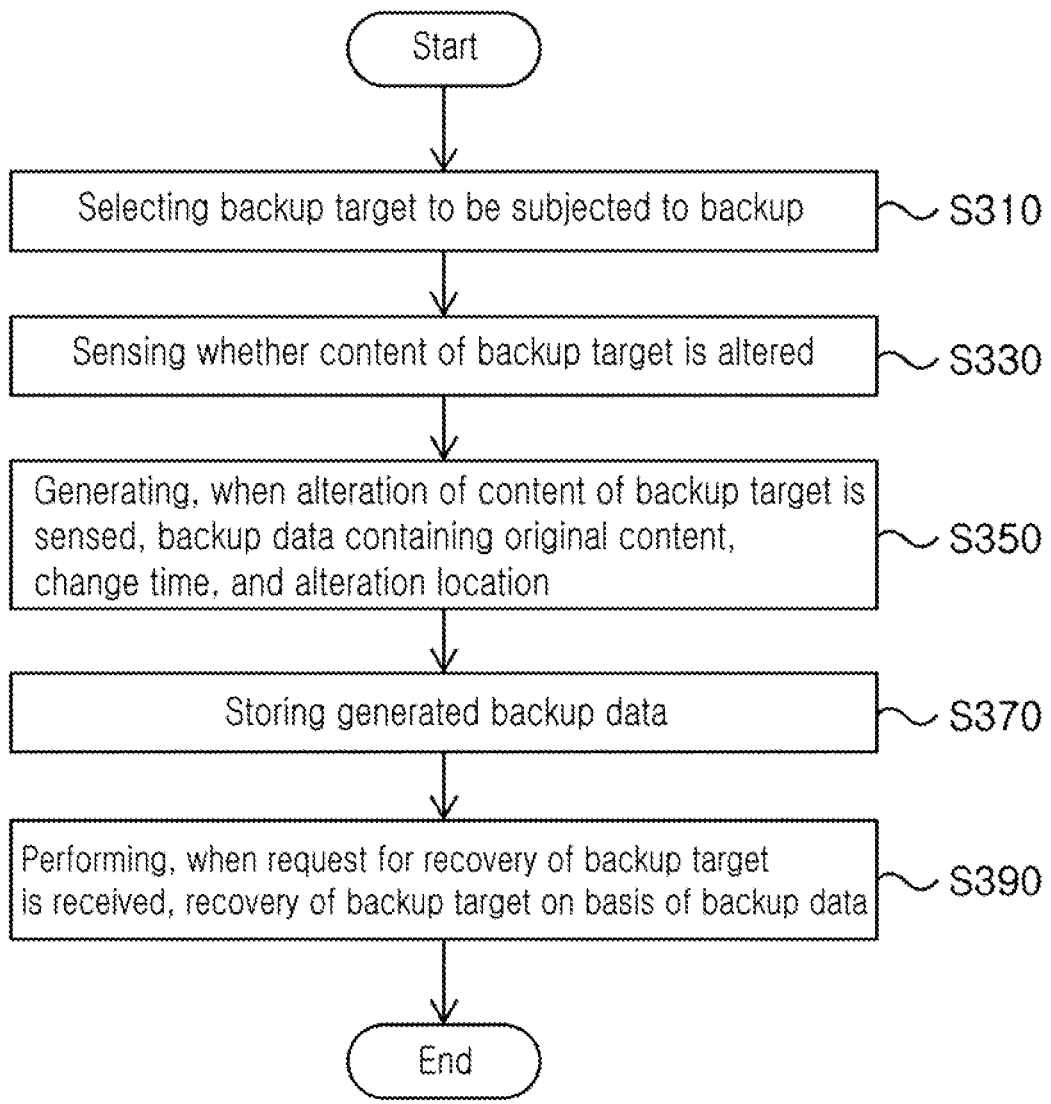
FIG. 3 is a flowchart illustrating an automatic backup process performed in the automatic backup device.

FIG. 3 is a flowchart illustrating an image-based patent search process performed in a patent search device of FIG. 1.

Referring to FIG. 3, the automatic backup device 130 may select, through the backup target selection unit 210, at least one backup target 110 to be subjected to backup, at step S310. In an embodiment, the backup target selection unit 210 may select some files or some devices within the same system as well as some files or some devices belonging to an external system, as the backup targets 110.

The automatic backup device 130 may sense, through the content alteration sensing unit 220, in real time whether the contents of the backup targets are altered or may scan all the backup targets 110 for sensing at particular-time intervals, at step S330.

When alteration of the content of the backup target 110 is sensed by the content alteration sensing unit 220, the automatic backup device 130 generates, through the backup data generation unit 230, the backup data containing information required for recovery of the sensed backup target, at step S350.

In an embodiment, the backup data generation unit 230 may generate the backup data for the backup target 110 in which a particular period passes, among the backup targets 110 in which alteration of the contents is not sensed by the content alteration sensing unit 220. The backup data generation unit 230 generates the backup data when the particular period passes even though the content of the backup target 110 is not altered for a long time, whereby a bad influence caused by unexpected damage may be prevented.

The automatic backup device 130 may store, through the backup data storage unit 240, the backup data generated by the backup data generation unit 230, at step S370. In an embodiment, when the capacity of the backup data exceeds the storable capacity of the backup data storage unit 240, the backup data storage unit 240 secures the storable capacity according to a particular option and stores the backup data.

In an embodiment, when the storable capacity is less than a particular reference, the backup data storage unit 240 secures the storable capacity according to a particular option and then stores the backup data. Herein, the particular reference may correspond to a particular capacity value of the storage space of the backup data storage unit 240 which is automatically or manually set by the automatic backup device 130. For example, when the storable capacity is decreased to be less than 100 MB, the backup data storage unit 240 performs a capacity securing operation in such a manner that the storable capacity is increased to be equal to or greater than 100 MB, regardless of the capacity of the backup data to be stored next.

In an embodiment, when the storable capacity is decreased to be lower than a reference capacity calculated through Equation below, the backup data storage unit 240 secures the storable capacity according to a particular option and then stores the backup data.

$$W = k \times T + j \times M \times \frac{1}{\ln\left(1 - \frac{N}{T}\right)} \quad \text{[Equation]}$$

Herein, W denotes the reference capacity; k and j denote coefficients; T denotes the total storage capacity of the backup data storage unit; M denotes the average capacity of the backup data to be stored when performing backup one time; and N denotes the storable capacity of the backup data storage unit.

The reference capacity may have a predetermined proportion of the total capacity T of the backup data storage unit 240, as a default capacity. The reference capacity may increase in proportion to the average capacity M of the backup data to be stored when performing backup one time. The reference capacity may increase in inverse proportion to the ln value for a ratio (1−N/T) of the total capacity of the currently stored backup data to the total capacity T of the backup data storage unit 240.

When a request for recovery is received, the automatic backup device 130 performs, through the backup target recovery unit 250, recovery of the backup target 110 on the basis of the backup data stored in the backup data storage unit 240, at step S390.

In an embodiment, the automatic backup device 130 may support a function of attaching an external storage device. Herein, the external storage device may store the backup data separately from the backup data storage unit 240 included in the automatic backup device 130, and may correspond to a storage device separable from the automatic backup device 130. For example, examples of the external storage device may include an external hard disk drive, a USB drive, and the like.

The automatic backup device 130 may support a secondary backup function through the function of attaching the external storage device. Even when the backup data storage unit 240 is unexpectedly damaged, the automatic backup device 130 performs recovery of the backup target 110 through secondary backup data stored in the external storage device.

The automatic backup device 130 may support a second backup function through the Internet. The automatic backup device 130 may be implemented independently of the storage device 150, and the independently implemented storage device 150 may be connected to the automatic backup device 130 over the network. For example, the automatic backup device 130 may store secondary backup data in cloud storage accessible through the Internet. The cloud storage has the advantage of unlimited storage capacity. Accordingly, the automatic backup device 130 may keep the full version of the backup data from a backup start point in time.

Although the present invention has been described with reference to the exemplary embodiments, those skilled in the art will appreciate that various modifications and variations can be made in the present invention without departing from the spirit or scope of the invention described in the appended claims.

DESCRIPTION OF THE REFERENCE NUMERALS IN THE DRAWINGS

100: Real time file alteration sensing-based automatic backup system
110: Backup target
410: Alteration of content of backup target
430: Backup data of backup target

The invention claimed is:

1. A real time file alteration sensing-based automatic backup device comprising:
a backup target selection hardware unit selecting backup targets that are accessible over a network and are subjected to backup;
a content alteration sensing hardware unit sensing in real time one or more backup targets whose contents are altered among the backup targets or scanning the backup targets for sensing at particular-time intervals;
a backup data generation hardware unit generating, when the one or more backup targets whose contents are altered are sensed, backup data containing information required for recovery of the one or more backup targets whose contents are altered;
a backup data storage hardware unit storing the backup data, and
a backup target recovery hardware unit performing, when a request for recovery of the one or more backup targets whose contents are altered is received, recovery of the one or more backup targets whose contents are altered on the basis of the backup data stored in the backup data storage hardware unit, wherein the backup data generation hardware unit generates the backup data containing at least one among an original content, a change time, and a storage location of the backup target and, generates first backup data by compressing the backup data or, when backup data same as the backup data is present, second backup data containing only information on a link for the backup data, wherein, after generating a backup folder having a name the same as a folder in which the backup target is stored, the backup data generation hardware unit generates in the backup folder a first directory having a name in the format of the backup target such as "file name.extension", after generating a second directory in the first directory, the second directory having a name in the format of "year.month.day_hour.minute.second" based on the change time of the backup target, the backup data generation hardware unit generates backup data having a name in the format of the backup target such as "file name.extension" in the second directory, and generates backup data for the backup target in which a particular period passes among the backup targets in which alteration of the contents is not sensed by the content change sensing hardware unit, when a capacity of the backup data exceeds a storable capacity of the backup data storage hardware unit, or when the storable capacity is decreased to be lower than a reference capacity calculated through Equation below by use of the total storage capacity and a storable capacity of the backup data storage hardware unit, and the average capacity of the backup data to be stored when performing backup one time, the backup data storage hardware unit 240 secures the storable capacity according to a particular option and then stores the backup data:

$$W = k \times T + j \times M \times \frac{1}{\ln\left(1 - \frac{N}{T}\right)},$$ [Equation]

where W denotes the reference capacity; k and j denote coefficients; T denotes the total storage capacity of the backup data storage hardware unit; M denotes the average capacity of the backup data to be stored when performing backup one time; and N denotes the storable capacity of the backup data storage hardware unit.

2. The real time file alteration sensing-based automatic backup device of claim 1, wherein the backup target recovery hardware unit performs recovery on the basis of any one of one or more pieces of the backup data stored in the backup data storage hardware unit.

3. The real time file alteration sensing-based automatic backup device of claim 1, wherein the content alteration sensing hardware unit scans all the backup targets to extract an alteration candidate file of which at least one among a file storage time and a file size is altered, and compares the alteration candidate file to the most recent backup data stored in the backup data storage hardware unit, thereby sensing whether the content is altered.

4. The real time file alteration sensing-based automatic backup device of claim 1, wherein the backup data storage hardware unit secures the storable capacity according to any one option among an option of initializing the backup data storage hardware unit with original data of the backup target, an option of deleting the backup data stored in the backup data storage hardware unit except only a particular amount of the backup data in chronological order, and an option of deleting the backup data stored in the backup data storage hardware unit except only the backup data after a particular point in time.

* * * * *